(12) United States Patent
Suzuki et al.

(10) Patent No.: US 7,147,382 B2
(45) Date of Patent: Dec. 12, 2006

(54) SUPPORT STRUCTURE IN CRANK MECHANISM AND COMPONENT CONSTITUTING CRANK MECHANISM

(75) Inventors: Tadatoshi Suzuki, Iwata (JP); Takanori Terada, Iwata (JP)

(73) Assignee: NTN Corporation, Osaka (JP)

( * ) Notice: Subject to any disclaimer, the term of this patent is extended or adjusted under 35 U.S.C. 154(b) by 240 days.

(21) Appl. No.: 10/798,886

(22) Filed: Mar. 12, 2004

(65) Prior Publication Data
US 2005/0109308 A1    May 26, 2005

(30) Foreign Application Priority Data
Mar. 13, 2003  (JP) .............................. 2003-068497
Feb. 23, 2004  (JP) .............................. 2004-046578

(51) Int. Cl.
*F16C 33/62* (2006.01)
(52) U.S. Cl. .................... 384/569; 384/492; 384/656; 384/625
(58) Field of Classification Search ................ 384/569, 384/565, 492, 625, 912
See application file for complete search history.

(56) References Cited

U.S. PATENT DOCUMENTS 5,180,450 A * 1/1993 Rao ........................... 148/579
6,012,851 A * 1/2000 Hirakawa et al. ............ 384/569
6,224,688 B1 * 5/2001 Takemura et al. ........... 384/492
6,290,398 B1 * 9/2001 Fujiwara et al. ............ 384/625
6,699,335 B1 * 3/2004 Murakami et al. .......... 148/320
2003/0123769 A1 * 7/2003 Ohki .......................... 384/492

FOREIGN PATENT DOCUMENTS

JP           08-4774        1/1996
JP           11-101247      4/1999

* cited by examiner

*Primary Examiner*—Thomas R. Hannon
(74) *Attorney, Agent, or Firm*—McDermott Will & Emery LLP

(57) ABSTRACT

A component of a crank mechanism is incorporated in the crank mechanism that converts reciprocating motion of a piston to rotary motion by means of a crank pin, a crank arm and a crank shaft via a connecting bar, and has a hydrogen content of no more than 0.5 ppm, austenite crystal grains of a grain size number exceeding 10, or a fracture stress value of no less than 2650 MPa. Thus, a support structure in and a component of a crank mechanism ensuring a long fatigue life, high anti-crack strength, and a reduced rate of secular dimensional change to improve dimensional stability, can be obtained.

9 Claims, 10 Drawing Sheets

SUPPORT STRUCTURE IN CRANK MECHANISM AND COMPONENT CONSTITUTING CRANK MECHANISM

BACKGROUND OF THE INVENTION

1. Field of the Invention

The present invention relates to a support structure in a crank mechanism and a component constituting the crank mechanism which converts reciprocating motion of a piston of an engine or the like to rotary motion by means of a crank pin, a crank arm and a crank shaft via a connecting bar.

2. Description of the Background Art

A crank mechanism converting the reciprocating motion of a piston to the rotary motion by means of a crank pin, a crank arm and a crank shaft via a connecting bar has conventionally been used in various fields. Typical application thereof is found, e.g., in two-wheeled vehicles, special vehicles, general-purpose two-cycle engine vehicles, and four-cycle engine vehicles. A support structure in the crank mechanism for these automobile engines includes a large-end bearing (provided between a connecting bar and a crank shaft and serving as a stress transmitting mechanism), a small-end bearing (provided between the connecting bar and a piston and serving as a stress transmitting mechanism), a crank shaft main bearing, and others. The support structure in the crank mechanism refers to a structure including these large-end and small-end bearings, crank shaft main bearing and others, and enabling conversion of the reciprocating motion of the piston to the rotary motion of the crank shaft.

For the support structure in the crank mechanism, a needle roller and cage assembly has conventionally been used to reduce size, weight and friction of the structure (see, e.g., Japanese Patent Laying-Open Nos. 11-101247 and 8-4774).

For the needle rollers in such a bearing of the support structure in the crank mechanism, a nitrided article of SUJ2 defined by JIS (Japanese Industrial Standard) has been used, and the needle roller and cage assembly having a large roller diameter has been used to ensure resistance to impact load.

The main bearing arranged at each end of the crank shaft rotatably supports the crank shaft that is driven to rotate by the large-end bearing. A deep groove ball bearing, for example, is used for the main bearing. This main bearing supporting the crank shaft experiences heavy impact load, as with the large-end and small-end bearings.

There is conventionally known a thermal treatment method ensuring a long life against rolling fatigue of a common bearing member, wherein a surface layer of the bearing member is subjected to a carbonitriding process, with an ammonia gas additionally mixed into an ambient RX gas at the time of heating. The carbonitriding process can harden the surface layer, generate residual austenite in the microstructure, and elongate a rolling fatigue life to some extent.

The support structure in the crank mechanism is required to have mechanical properties (1) ensuring a long life against rolling fatigue, (2) improving anti-crack strength, and (3) suppressing an increase in rate of secular dimensional change. For the future support structure in the crank mechanism to be subjected to heavier load and higher speed, mechanical properties ensuring its use under the conditions of heavier load and higher temperature than before is all the more required.

SUMMARY OF THE INVENTION

Based on the foregoing, an object of the present invention is to provide a support structure in a crank mechanism and a component constituting the crank mechanism, which are of high strength and capable of (1) ensuring a long fatigue life (a long rolling fatigue life in the case of the support structure), (2) having large anti-crack strength, and (3) suppressing an increase in rate of secular dimensional change to improve dimensional stability.

A component of a crank mechanism according to an aspect of the present invention is a component incorporated in a crank mechanism that converts reciprocating motion of a piston to rotary motion by means of a crank pin, a crank arm and a crank shaft via a connecting bar. The component contains austenite crystal grains having a grain size number exceeding 10.

A support structure in a crank mechanism according to the aspect of the present invention is a support structure in a crank mechanism that converts reciprocating motion of a piston to rotary motion by means of a crank pin, a crank arm and a crank shaft via a connecting bar. The support structure has a plurality of bearings arranged therein, each having an inner member, an outer member and a plurality of rolling elements. In at least one of the bearings, at least one of the inner and outer members and the rolling elements contains austenite crystal grains having a grain size number exceeding 10.

According to the component and the support structure of the crank mechanism of the present aspect of the invention, such fine austenite grains considerably improve anti-crack strength, dimensional stability and fatigue life (rolling fatigue life in the case of the support structure). The austenite grain size number is set in a range exceeding 10, normally 11 or greater, since considerable improvement in fatigue life cannot be expected with the grain size number of 10 or smaller. Although finer austenite grains are more desirable, it is usually difficult to obtain those having the grain size number exceeding 13. In each of the component and the support structure of the crank mechanism, the austenite grains exhibit similar characteristics at the surface layer, considerably affected by the carbonitriding process, and at the inner portion thereof. Thus, the above-described range of the crystal grain size numbers corresponds to both the surface layer and the inner portion thereof.

A component of a crank mechanism according to another aspect of the present invention is a component incorporated in a crank mechanism that converts reciprocating motion of a piston to rotary motion by means of a crank pin, a crank arm and a crank shaft via a connecting bar. The component has a fracture stress value of no less than 2650 MPa.

A support structure in a crank mechanism according to the present aspect of the invention is a support structure in a crank mechanism that converts reciprocating motion of a piston to rotary motion by means of a crank pin, a crank arm and a crank shaft via a connecting bar. The support structure has a plurality of bearings arranged therein, each having an inner member, an outer member and a plurality of rolling elements. In at least one of the bearings, at least one of the inner and outer members and the rolling elements has a fracture stress value of no less than 2650 MPa.

The inventors have found that it is possible to obtain steel having a nitriding layer exhibiting such a conventionally unachievable fracture stress value of no less than 2650 MPa, by carbonitriding steel at a temperature higher than an $A_1$ transformation temperature, then cooling the steel to a temperature of less than the $A_1$ transformation temperature, and then re-heating the steel to a range in temperature of no less than the $A_1$ transformation temperature, and quenching the steel. As such, a component of and a support structure in a crank mechanism that are superior in fracture stress to the conventional ones, and thus of high strength, can be obtained.

A component of a crank mechanism according to yet another aspect of the present invention is a component incorporated in a crank mechanism that converts reciprocating motion of a piston to rotary motion by means of a crank pin, a crank arm and a crank shaft via a connecting bar. The component has a hydrogen content of no more than 0.5 ppm.

A support structure in a crank mechanism according to the present aspect of the invention is a support structure in a crank mechanism that converts reciprocating motion of a piston to rotary motion by means of a crank pin, a crank arm and a crank shaft via a connecting bar. The support structure has a plurality of bearings arranged therein, each having an inner member, an outer member and a plurality of rolling elements. In at least one of the bearings, at least one of the inner and outer members and the rolling elements has a hydrogen content of no more than 0.5 ppm.

According to the component of and the support structure in the crank mechanism of the present aspect of the invention, it is possible to alleviate embrittlement of the steel attributable to hydrogen. If the hydrogen content of the steel exceeds 0.5 ppm, anti-crack strength of the steel would be reduced. Such steel cannot be used for a portion to be subjected to extensive load. Although smaller amounts of hydrogen are desirable, reducing an amount of hydrogen to less than 0.3 ppm requires heating for a long period of time. In such a case, austenite grains would have a coarse and large diameter, and toughness would rather be impaired. Accordingly, a hydrogen content falling within a range of 0.3–0.5 ppm is desirable, and that falling within a range of 0.35–0.45 ppm is still more desirable.

In measuring the above hydrogen content, diffusible hydrogen is not measured and only the non-diffusible hydrogen released from the steel at a predetermined temperature or higher is measured. Diffusible hydrogen in a sample of small size is released from the sample to be scattered even at room temperature, and therefore, the diffusible hydrogen is not measured. Non-diffusible hydrogen is trapped in any defect in the steel and only released from the sample at a predetermined heating temperature or higher. Even if only the non-diffusible hydrogen is measured, the hydrogen content considerably varies depending on the method of measurement. The above-mentioned range of hydrogen content is determined by thermal conductimetry. As will be detailed later, the measurement may be taken by means of a LECO DH-103 hydrogen determinator or a like measuring device.

In the above-described support structure in the crank mechanism, at least one of the bearings arranged in the support structure is a bearing that is located at an end of the crank shaft to rotatably support the crank shaft.

With this configuration, the crank shaft main bearing formed of a deep groove ball bearing, for example, can be elongated in rolling fatigue life, improved in anti-crack strength, and ensured in dimensional stability.

A producing method of a component of a crank mechanism (including a support structure in the crank mechanism) according to the present invention is a producing method of a component incorporated in a crank mechanism that converts reciprocating motion of a piston to rotary motion by means of a crank pin, a crank arm and a crank shaft via a connecting bar. The method is characterized in that the process of producing the component includes the steps of carbonitriding steel for a bearing component at a carbonitriding temperature exceeding an $A_1$ transformation temperature, then cooling the steel to a temperature of less than the $A_1$ transformation temperature, and then re-heating the steel to a range in temperature of no less than the $A_1$ transformation temperature, and quenching the steel.

According to the producing method of the component of the crank mechanism (including the support structure in the crank mechanism) of the present invention, final quenching is done after the steel is carbonitrided and then cooled down to a temperature of less than the $A_1$ transformation temperature, and thus, fine austenite grains can be obtained. Accordingly, a Charpy impact value, a fracture toughness value, anti-crack strength, fatigue life (rolling fatigue life in the case of the support structure) and others can be improved.

Further, by cooling the steel to a temperature permitting transformation of austenite, for example, the austenite grain boundaries at the time of carbonitriding and the austenite grain boundaries at the time of final quenching can be made irrelevant to each other. Still further, since the heating temperature at the time of final quenching is lower than the heating temperature at the time of carbonitriding, the amount of undissolved cementite at the surface layer affected by carbonitriding increases in the final quenching process than in the carbonitriding process. As such, at the heating temperature for the final quenching, the ratio in amount of the undissolved cementite increases and the ratio in amount of the austenite decreases compared to those at the time of carbonitriding. Furthermore, from the iron-carbon binary phase diagram, in a region where cementite and austenite coexist, concentration of carbon dissolved in the austenite decreases as the quenching temperature decreases.

When the steel is heated to the final quenching temperature, the austenite grains become fine, due to the existence of a large amount of undissolved cementite suppressing growth of the austenite grains. The structure having undergone transformation from austenite to martensite or bainite by quenching is low in carbon concentration, so that the structure is superior in toughness to a structure quenched from a carbonitriding temperature.

In the above-described producing method of the component of the crank mechanism, the quenching temperature is preferably in a range from 790° C. to 830° C.

As such, the steel is re-heated to a temperature at which the austenite crystal grains are less likely to grow prior to the quenching. This can reduce the size of the austenite grains.

Herein, the inner member or the outer member may be an inner ring or an outer ring provided separately from the shaft, housing or any other member. Alternatively, the inner member or the outer member may function as the inner ring or the outer ring integrated with the shaft, housing or any other member.

Further, the austenite grains herein refer to crystal grains of austenite having been phase-transformed during the heating process. The traces remain in the ferrite phase of martensite or bainite after quenching. The term "prior" may be applied thereto, to emphasize the grain boundaries of austenite before the quenching process. That is, an austenite grain and a prior austenite grain refer to the same substance.

The prior austenite grain boundaries can be observed after being subjected to a process manifesting the grain boundary, such as an etching process for a metal phase sample of the member of interest. For measurement of the grain size, the average of ASTM (American Society for Testing and Materials)-defined grain size numbers (=average grain size of at most 8 μm) may be converted to obtain an average grain diameter, or the intercept method or the like may be used in which a straight line is placed on a metal phase structure in an arbitrary direction to obtain an average length between points at which the straight line meets grain boundaries.

The nitriding layer may be formed by a carbonitriding process, as will be described later. The nitriding layer may or may not be enriched with carbon.

As described above, when the component of and the support structure in the crank mechanism of the present invention are used and the nitriding layer is formed, anti-crack strength, dimensional stability and fatigue life (rolling fatigue life in the case of the support structure) are improved considerably. The crank mechanism can be reduced in size as well.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

Figure 1:
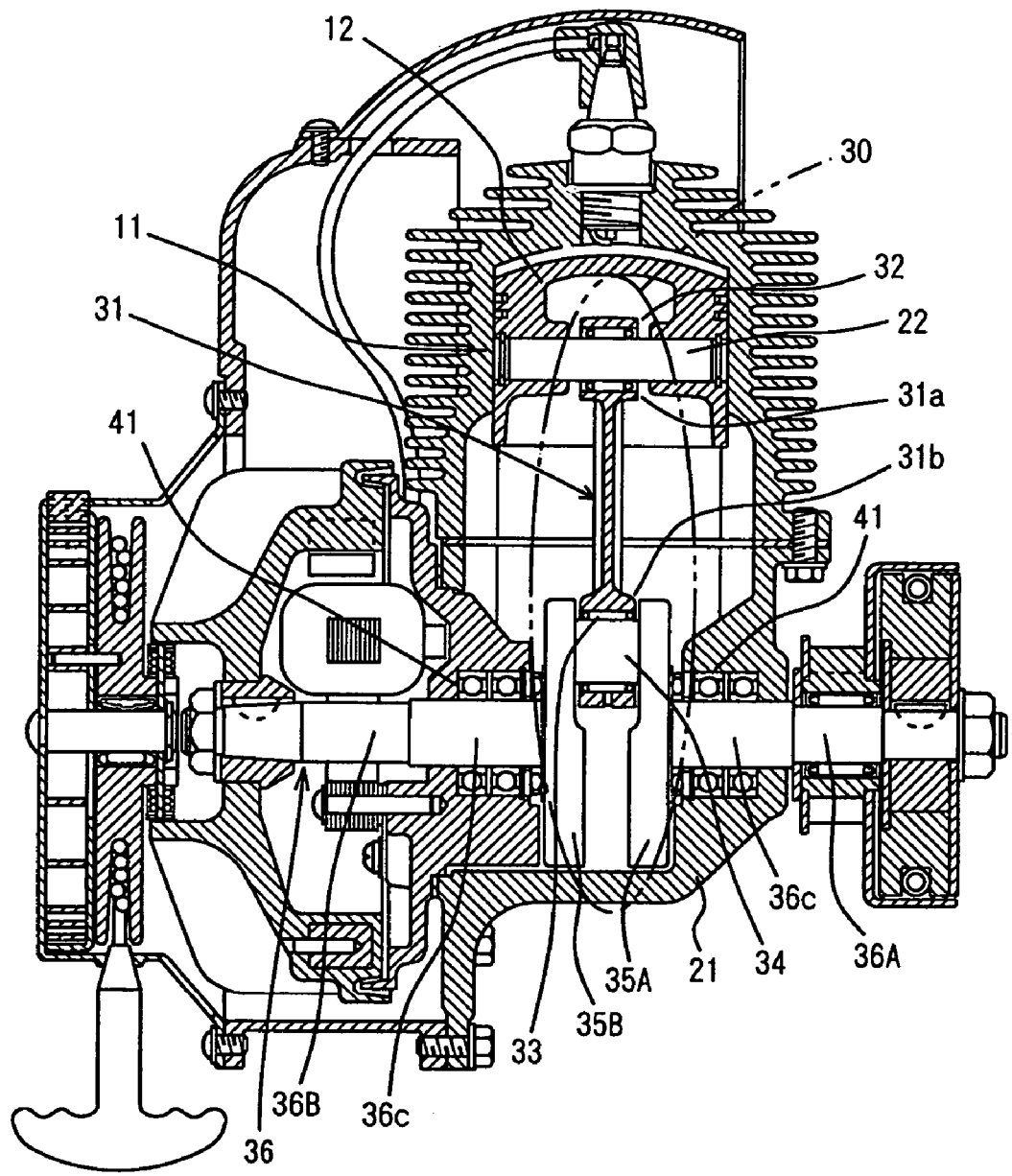
FIG. 1 is a schematic cross sectional view of an engine portion having incorporated therein a support structure of a crank mechanism according to an embodiment of the present invention.

Referring mainly to FIG. 1, the engine portion includes a cylinder casing having a cylinder 11, a crank case 21, and a crank mechanism 30. Major part of crank mechanism 30 is arranged inside cylinder 11 or in an inner space of crank case 21.

Crank mechanism 30 includes, among others, a piston 12, a piston small-end shaft 22, a small-end bearing 32, a connecting bar 31, a large-end bearing 33, a crank shaft 36, and a crank shaft main bearing 41.

Piston 12 is arranged in cylinder 11 to allow sliding (reciprocating) motion thereof Piston small-end shaft 22 is fixedly attached to piston 12.

Crank shaft 36 includes a first crank shaft portion 36A, a second crank shaft portion 36B, crank journals 36c, 36c, a first crank arm 35A, a second crank arm 35B, and a crank pin 34. Crank shaft 36 has its crank journal 36c rotatably attached to crank case 21 or the like via crank shaft main bearing 41. The axis line (center line) of crank pin 34 is offset with respect to the axis line (center of rotation) of first and second crank shaft portions 36A and 36B, by first and second crank arms 35A and 35B.

Piston 12 and crank shaft 36 are connected to each other via connecting bar 31.

Figure 2A:
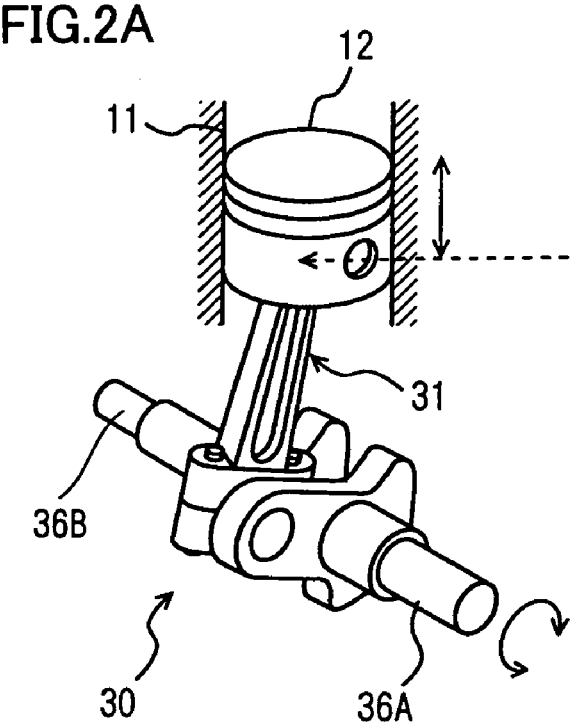
FIG. 2A is a schematic perspective view of a main portion of the crank mechanism incorporated in the engine portion of FIG. 1, and FIGS. 2B and 2C are schematic diagrams of a connecting bar assembly and a crank shaft, respectively.
Figure 2B:
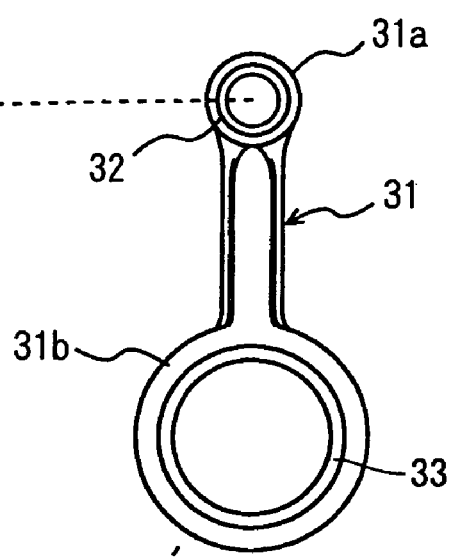
Figure 2C:
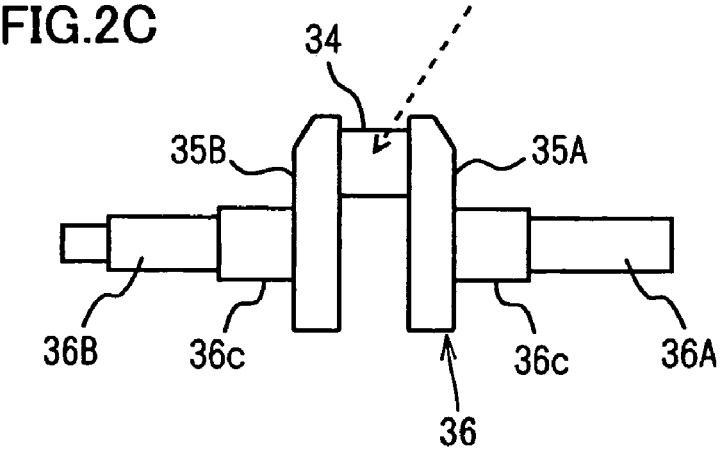

Referring mainly to FIG. 2B, connecting bar 31 has a small-end portion 31a at one end and a large-end portion 31b at the other end. Small-end bearing 32 is arranged in a hole provided at small-end portion 31a, and large-end bearing 33 is arranged in a hole provided at large-end portion 31b. With this small-end bearing 32, small-end portion 31a is rotatably supported by piston small-end shaft 22, as shown in FIGS. 1 and 2A. With large-end bearing 33, large-end portion 31b is rotatably supported by crank pin 34, as shown in FIGS. 1 and 2C.

Referring mainly to FIG. 1, connecting bar 31 is connected to piston small-end shaft 22 on one end and crank pin 34 on the other end both in a rotatable manner, as described above. Thus, large-end portion 31b of connecting bar 31 rotates with respect to crank pin 34 and, at the same time, moves eccentrically with respect to the center of rotation of crank shaft 36. Small-end portion 31a slides (reciprocates) with respect to cylinder 11 while it rotates with respect to piston small-end shaft 22. As such, the sliding (reciprocating) motion of piston 12 is converted to the eccentric motion of crank pin 34, and crank shaft 36 is driven to rotate, so that the rotational driving force is obtained.

The support structure in the crank mechanism according to the present embodiment includes small-end bearing 32, large-end bearing 33, and crank shaft main bearing 41. Small-end bearing 32 and large-end bearing 33 may each be a needle roller bearing 20 as shown, e.g., in FIG. 3A, and crank shaft main bearing 41 may be a deep groove ball bearing 10 as shown, e.g., in FIG. 3B.

Figure 3A:
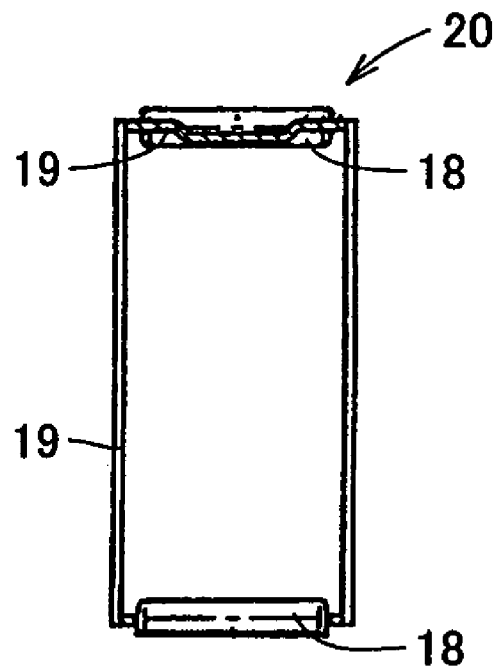
FIGS. 3A and 3B show support structures in crank mechanisms, specifically showing in cross sections configurations of a needle roller bearing and a deep groove ball bearing, respectively.

Referring to FIG. 3A, needle roller bearing 20 includes a plurality of needle rollers 18 as rolling elements arranged in a circumferential direction, a cage 19 holding each of the plurality of needle rollers 18, an inner member (not shown) serving as an inner ring, and an outer member (not shown) serving as an outer ring. In the configuration of FIG. 1, neither small-end bearing 32 nor large-end bearing 33 has inner and outer rings that are provided in a conventional needle roller bearing. In small-end bearing 32, piston small-end shaft 22 is the inner member serving as the inner ring having a rolling contact surface on its outer peripheral surface, and connecting bar small-end portion 31a is the outer member serving as the outer ring having a rolling contact surface on its inner peripheral surface. In large-end bearing 33, crank pin 34 is the inner member serving as the inner ring having a rolling contact surface on its outer periphery, and connecting bar large-end portion 31b is the outer member serving as the outer ring having a rolling contact surface on its inner periphery.

It is noted that small-end and large-end bearings 32 and 33 may each have such inner and outer rings as those employed in a conventional needle roller bearing.

Figure 3B:
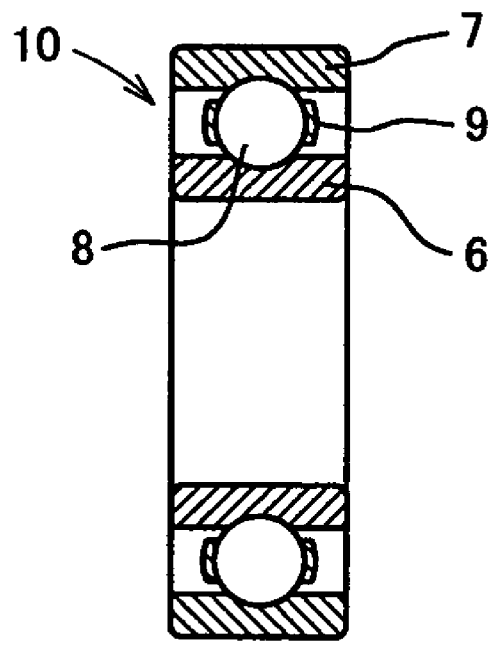

Referring to FIG. 3B, deep groove ball bearing 10 includes a plurality of balls 8 as the rolling elements arranged in a circumferential direction, a cage 9 holding each of the plurality of balls 8, an inner ring (inner member) 6, and an outer ring (outer member) 7. In the configuration of FIG. 1, crank shaft main bearing 41 has inner and outer rings that are provided in a conventional deep groove ball bearing, although it may not have these inner and outer rings. In such a case, in FIG. 1, crank journal 36c may be the inner member serving as the inner ring having a rolling contact surface on its outer peripheral surface, and crank case 21 or the like may be the outer member serving as the outer ring having a rolling contact surface on its inner peripheral surface.

In the support structure (small-end bearing 32, large-end bearing 33, crank shaft main bearing 41) in the crank mechanism of the present embodiment, at least one of the inner member (piston small-end shaft 22, crank pin 34, inner ring 6), the outer member (connecting bar small-end portion 31a, connecting bar large-end portion 31b, outer ring 7), and the rolling elements (needle rollers 18, balls 8) included therein has a nitriding layer, and has a hydrogen content of no more than 0.5 ppm.

In the support structure (small-end bearing 32, large-end bearing 33, crank shaft main bearing 41) in the crank mechanism of the present embodiment, at least one of the inner member (piston small-end shaft 22, crank pin 34, inner ring 6), the outer member (connecting bar small-end portion 31a, connecting bar large-end portion 31b, outer ring 7), and the rolling elements (needle rollers 18, balls 8) included therein has a nitriding layer, and contains austenite crystal grains having a grain size number exceeding 10.

In the support structure (small-end bearing 32, large-end bearing 33, crank shaft main bearing 41) in the crank mechanism of the present embodiment, at least one of the inner member (piston small-end shaft 22, crank pin 34, inner ring 6), the outer member (connecting bar small-end portion 31a, connecting bar large-end portion 31b, outer ring 7), and the rolling elements (needle rollers 18, balls 8) included therein has a nitriding layer, and has a fracture stress value of no less than 2650 MPa.

Further, the component (at least one of the inner member, the outer member and the rolling elements of the above-described support structure, piston 12, piston small-end shaft 22, connecting bar 31, crank shaft 36 and others) of the crank mechanism of the present embodiment has a nitriding layer, and has a hydrogen content of no more than 0.5 ppm.

Further, the component (at least one of the inner member, the outer member and the rolling elements of the above-described support structure, piston 12, piston small-end shaft 22, connecting bar 31, crank shaft 36 and others) of the crank mechanism of the present embodiment has a nitriding layer, and contains austenite crystal grains having a grain size number exceeding 10.

Further, the component (at least one of the inner member, the outer member and the rolling elements of the above-described support structure, piston 12, piston small-end shaft 22, connecting bar 31, crank shaft 36 and others) of the crank mechanism of the present embodiment has a nitriding layer, and has a fracture stress value of no less than 2650 MPa.

Described above is the case where piston small-end shaft 22 is fixed to piston 12 and rotatable with respect to connecting bar 31, as shown in FIG. 1. However, piston small-end shaft 22 may be fixed to the connecting bar and made rotatable with respect to the piston. Hereinafter, the configuration therefor is explained.

Figure 4:
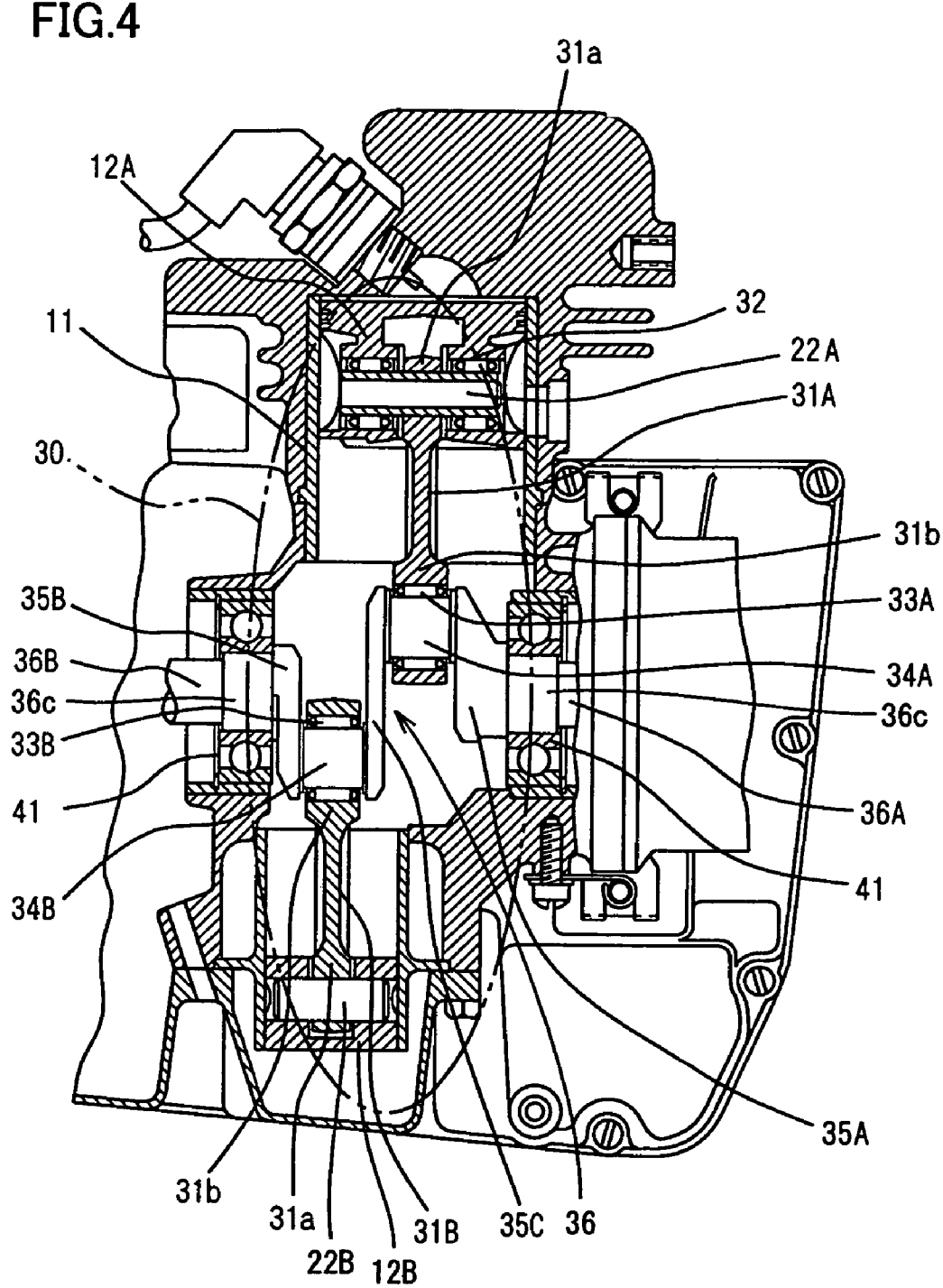
FIG. 4 is a schematic cross sectional view of an engine portion having incorporated therein a crank mechanism of the type having a piston small-end shaft rotatably arranged with respect to a piston and fixed to a connecting bar.

Referring to FIG. 4, crank mechanism 30 of this configuration includes two sets of pistons 12A, 12B that are allowed to slide (reciprocate) by means of one crank shaft 36.

Crank shaft 36 has a first crank shaft portion 36A, a second crank shaft portion 36B, crank journals 36c, 36c, a first crank arm 35A, a second crank arm 35B, a third crank arm 35C, and crank pins 34A, 34B.

One piston 12A is connected via connecting bar 31A to crank pin 34A of crank shaft 36. Piston small-end shaft 22A is fixed to small-end portion 31a of connecting bar 31A. With small-end bearing 32, piston 12A is supported by pin small-end shaft 22A in a rotatable manner. With large-end bearing 33A, large-end portion 31b of connecting bar 31A is supported by crank pin 34A in a rotatable manner.

The other piston 12B is connected via connecting bar 31B to crank pin 34B of crank shaft 36. Piston small-end shaft 22B is fixed to small-end portion 31a of connecting bar 31B, and piston 12B is rotatably supported by piston small-end shaft 22B. Large-end portion 31b of connecting bar 31B is rotatably supported by crank pin 34B by means of large-end bearing 33B.

Crank shaft 36 has its crank journal 36c rotatably supported by crank shaft main bearing 41.

The support structure in the crank mechanism shown in FIG. 4 includes small-end bearing 32, large-end bearings 33A, 33B, and crank shaft main bearing 41. Small-end bearing 32 and large-end bearings 33A, 33B may each be a needle roller bearing 20 as shown, e.g., in FIG. 3A, and crank shaft main bearing 41 may be a deep groove ball bearing 10 as shown, e.g., in FIG. 3B.

In the support structure (small-end bearing 32, large-end bearings 33A, 33B, crank shaft main bearing 41) in the crank mechanism shown in FIG. 4, at least one of the inner member (piston small-end shaft 22A, crank pins 34A, 34B, inner ring 6), the outer member (piston 12A, connecting bar large-end portion 31b, outer ring 7), and the rolling elements (needle rollers 18, balls 8) included therein has a nitriding layer, and has a hydrogen content of no more than 0.5 ppm.

In the support structure (small-end bearing 32, large-end bearings 33A, 33B, crank shaft main bearing 41) in the crank mechanism of the present embodiment, at least one of the inner member (piston small-end shaft 22A, crank pins 34A, 34B, inner ring 6), the outer member (piston 12A, connecting bar large-end portion 31b, outer ring 7), and the rolling elements (needle rollers 18, balls 8) included therein has a nitriding layer, and contains austenite crystal grains having a grain size number exceeding 10.

In the support structure (small-end bearing 32, large-end bearings 33A, 33B, crank shaft main bearing 41) in the crank mechanism of the present embodiment, at least one of the inner member (piston small-end shaft 22A, crank pins 34A, 34B, inner ring 6), the outer member (piston 12A, connecting bar large-end portion 31b, outer ring 7), and the rolling elements (needle rollers 18, balls 8) included therein has a nitriding layer, and has a fracture stress value of no less than 2650 MPa.

Further, the component (at least one of the inner member, the outer member and the rolling elements of the above-described support structure, pistons 12A, 12B, piston small-end shafts 22A, 22B, connecting bars 31A, 31B, crank shaft 36 and others) of the crank mechanism of the present embodiment has a nitriding layer, and has a hydrogen content of no more than 0.5 ppm.

Further, the component (at least one of the inner member, the outer member and the rolling elements of the above-described support structure, pistons 12A, 12B, piston small-end shafts 22A, 22B, connecting bars 31A, 31B, crank shaft 36 and others) of the crank mechanism of the present embodiment has a nitriding layer, and contains austenite crystal grains having a grain size number exceeding 10.

Further, the component (at least one of the inner member, the outer member and the rolling elements of the above-described support structure, pistons 12A, 12B, piston small-end shafts 22A, 22B, connecting bars 31A, 31B, crank shaft 36 and others) of the crank mechanism of the present embodiment has a nitriding layer, and has a fracture stress value of no less than 2650 MPa.

Other than described above, the configuration shown in FIG. 4 is similar to the configurations shown in FIGS. 1–3B, and thus, the same components are denoted by the same reference characters, and description thereof is not repeated.

Hereinafter, thermal treatment including a carbonitriding process performed on a component of a crank mechanism (a support structure in the crank mechanism) according to the present invention is described.

Figure 5:
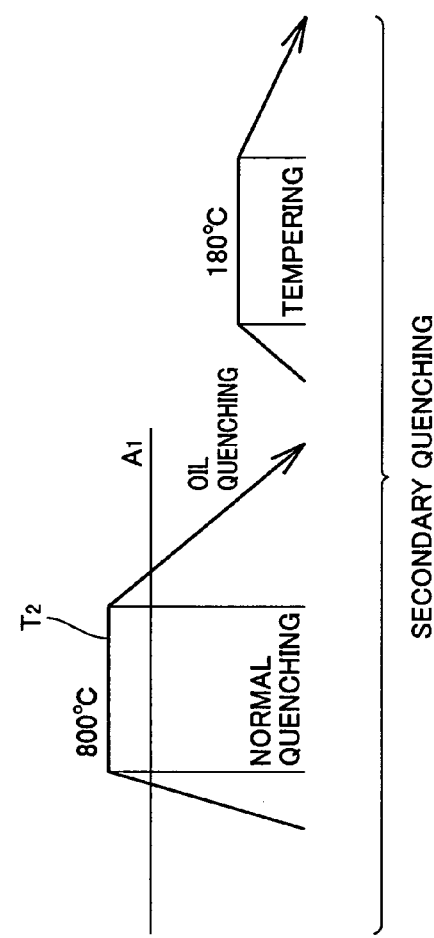
FIG. 5 illustrates a thermal treatment process to be applied to a component of a crank mechanism according to an embodiment of the present invention.
Figure 5:
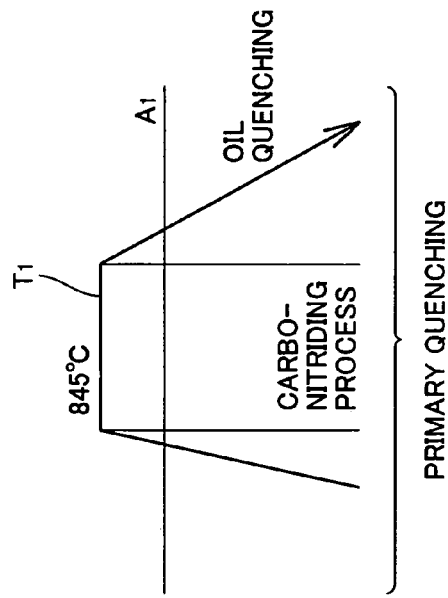
Figure 6:
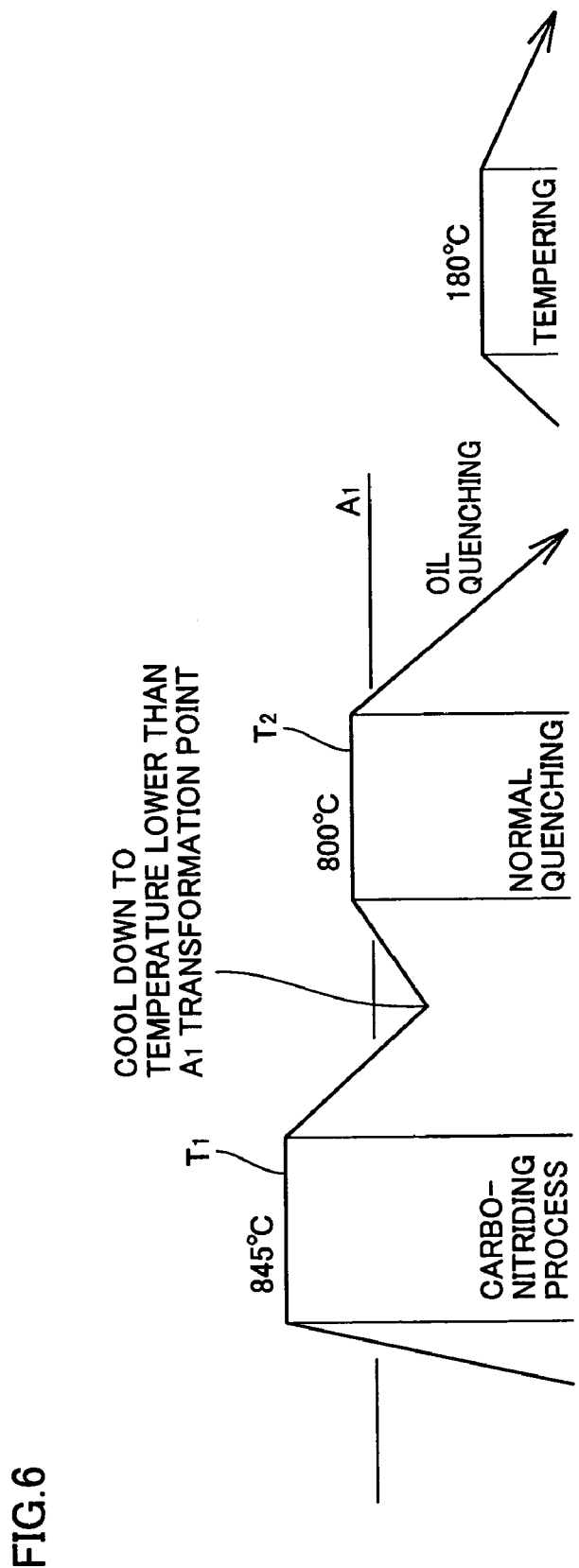
FIG. 6 illustrates a modification of the thermal treatment process to be applied to the component of the crank mechanism according to the embodiment of the present invention.

FIGS. 5 and 6 show thermal treatment methods according to the present invention. FIG. 5 shows a thermal treatment pattern where primary quenching and secondary quenching are both performed. FIG. 6 shows a thermal treatment pattern where a material is cooled to a temperature lower than the $A_1$ transformation temperature in the course of quenching and thereafter re-heated for final quenching. The both patterns are embodiments of the present invention.

Referring to FIG. 5, steel for a bearing component, for example, is firstly heated to a carbonitriding temperature (e.g. 845° C.) exceeding the $A_1$ transformation temperature. At the temperature, the steel for the bearing component is subjected to the carbonitriding process. During the process $T_1$ at this temperature, carbon and nitrogen are diffused through the matrix of the steel, and the carbon is sufficiently dissolved in the steel. Thereafter, the steel for the bearing component is subjected to oil quenching from the temperature of process $T_1$, and cooled to a temperature lower than the $A_1$ transformation temperature. Tempering is then performed at 180° C., although the tempering may be skipped.

Thereafter, the steel for the bearing component is re-heated to a temperature (of, e.g., 800° C.) that is not lower than the $A_1$ transformation temperature but lower than the above-described carbonitriding temperature. The process $T_2$ is conducted at this temperature, and then oil quenching is performed from the temperature of process $T_2$, followed by cooling to a temperature lower than the $A_1$ transformation temperature. Tempering is then performed at 180° C.

Referring to FIG. 6, the steel for the bearing component is firstly heated to a carbonitriding temperature (845° C.) exceeding the $A_1$ transformation temperature. The steel, kept at this temperature, is subjected to the carbonitriding process. In the process $T_1$ of this temperature, carbon and nitrogen are diffused through the steel matrix, and the carbon is sufficiently dissolved into the steel. Thereafter, the steel for the bearing component is cooled to the $A_1$ transformation temperature or lower, without being subjected to quenching. The steel is then re-heated to a temperature (of, e.g., 800° C.) that is not lower than the $A_1$ transformation temperature but lower than the above-described carbonitriding temperature. The steel is kept at this temperature and subjected to the process $T_2$. Oil quenching is conducted from the temperature of process $T_2$, and the steel is cooled to a temperature lower than the $A_1$ transformation temperature. Tempering is then conducted at 180° C.

Compared with normal quenching (by which carbonitriding is done and immediately thereafter quenching is done once), the above-discussed thermal treatment can provide enhanced anti-crack strength and reduced secular dimensional change rate while carbonitriding the surface layer. As described above, this thermal treatment can produce a microstructure having austenite crystal grains of a grain size smaller than conventional by one half or more. The component of the crank mechanism and the support structure in the crank mechanism having undergone the above-described thermal treatment can ensure a long fatigue life (a long rolling fatigue life in the case of the support structure), improve the anti-crack strength, and reduce the secular dimensional change rate.

In either case of the above-described thermal treatments, the carbonitriding process can produce a nitriding layer, or, a "carbonitriding layer". Since the base material for the carbonitriding process, i.e., the steel, has a high concentration of carbon, carbon in the atmosphere of the normal carbonitriding process may not enter the surface of the steel easily. For example, if the steel has a high carbon concentration (of about 1% by weight), a carburized layer having a higher carbon concentration than this value may or may not be formed. A concentration of nitrogen in normal steel, however, is typically as low as approximately no more than 0.025% by weight at the maximum, although it depends on a concentration of Cr or the like. Therefore, a nitriding layer can apparently be formed regardless of the concentration of carbon in source steel. It will be appreciated that the nitriding layer may also be enriched with carbon.

Figure 7A:
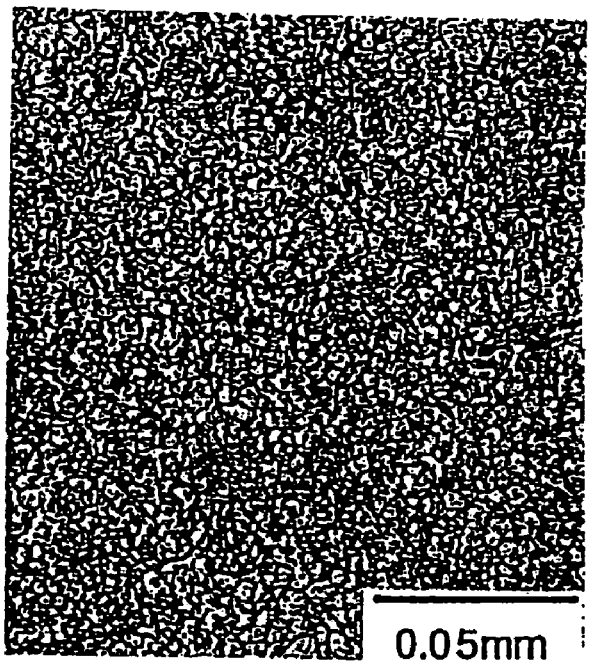
FIGS. 7A and 7B show microstructures, particularly austenite grains, of a bearing component of the present invention and of a conventional bearing component, respectively.
Figure 7B:
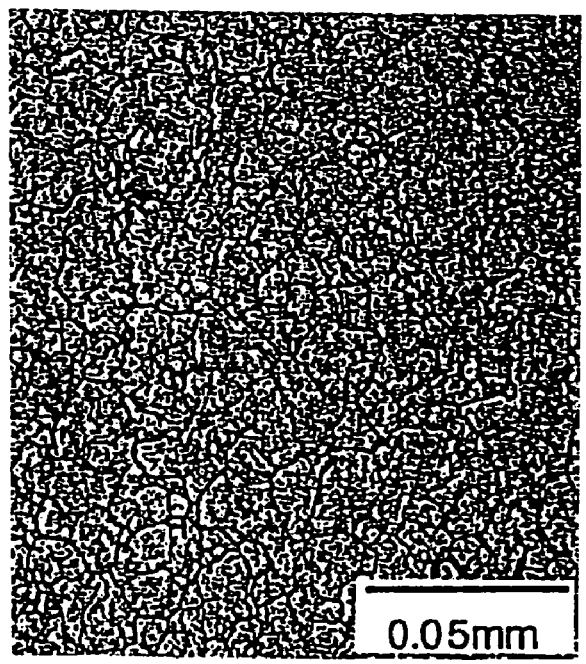
Figure 8A:
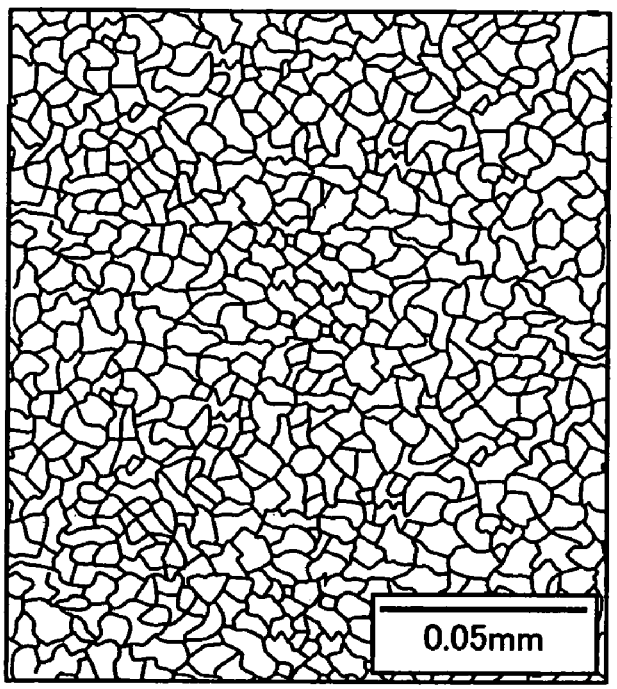
FIGS. 8A and 8B diagrammatically show austenite grain boundaries corresponding respectively to FIGS. 7A and 7B.
Figure 8B:
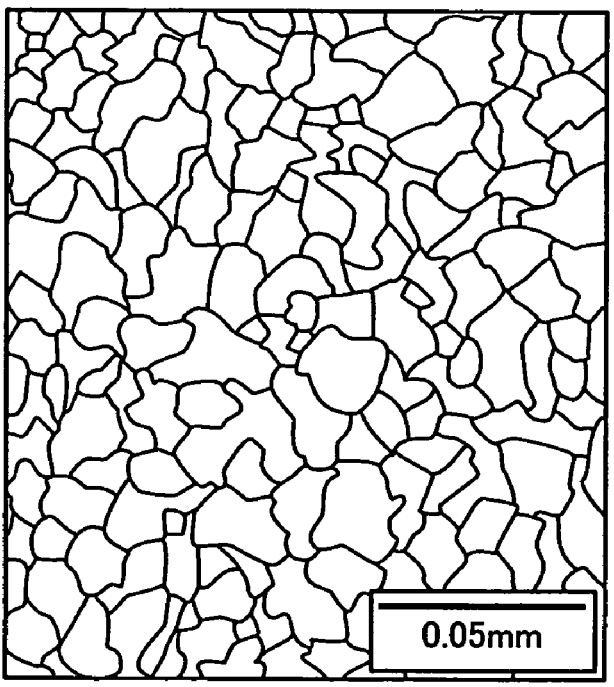

FIG. 7A shows austenite crystal grain size of bearing steel having undergone the thermal treatment pattern shown in FIG. 5. For comparison, FIG. 7B shows austenite crystal grain size of bearing steel having undergone a conventional thermal treatment method. FIGS. 8A and 8B diagrammatically show the austenite crystal grain sizes shown in FIGS. 7A and 7B, respectively. As seen from these diagrams showing the austenite crystal grain sizes, while the conventional austenite grain size corresponds to the JIS-defined grain size number of 10, a fine grain of the grain size number of 12 is obtained by the thermal treatment of the present invention. Further, the average grain diameter in FIG. 7A, measured by the intercept method, was 5.6 μm.

Hereinafter, experiments of the present invention will be described.

EXAMPLE 1

JIS-SUJ2 (1.0 wt % of C-0.25 wt % of Si-0.4 wt % of Mn—1.5 wt % of Cr) was used for Example 1 of the present invention. Samples shown in Table 1 were each produced through the procedure described below.

TABLE 1

| | sample | | | | | | | |
|---|---|---|---|---|---|---|---|---|
| | A | B | C | D | E | F | conventional carbonitrided sample | normal quenched sample |
| secondary quenching temperature (° C.) | 780[1)] | 800 | 815 | 830 | 850 | 870 | — | — |
| hydrogen amount (ppm) | — | 0.37 | 0.40 | 0.38 | 0.42 | 0.40 | 0.72 | 0.38 |

TABLE 1-continued

| | sample | | | | | | conventional carbonitrided sample | normal quenched sample |
|---|---|---|---|---|---|---|---|---|
| | A | B | C | D | E | F | | |
| crystal grain size (JIS) | — | 12 | 11.5 | 11 | 10 | 10 | 10 | 10 |
| Charpy impact value (J/cm²) | — | 6.65 | 6.40 | 6.30 | 6.20 | 6.30 | 5.33 | 6.70 |
| fracture stress value (MPa) | — | 2840 | 2780 | 2650 | 2650 | 2700 | 2330 | 2770 |
| relative rolling fatigue life ($L_{10}$) | — | 5.4 | 4.2 | 3.5 | 2.9 | 2.8 | 3.1 | 1 |

[1]evaluation failed due to insufficient quenching

Samples A-D: examples of the present invention

Carbonitriding was performed at 850° C. held for 150 minutes in an atmosphere of a mixture of RX gas and ammonia gas. Following the thermal treatment pattern shown in FIG. 5, primary quenching was done from a carbonitriding temperature of 850° C., and secondary quenching was subsequently done by heating to a temperature in a temperature range from 780° C. to 830° C., lower than the carbonitriding temperature. Sample A with a secondary quenching temperature of 780° C. was not tested, since quenching of sample A was insufficient.

Samples E and F: examples of the present invention

These samples were carbonitrided through the same procedure as that of samples A-D of the present invention. The secondary quenching was done at a temperature from 850° C. to 870° C., equal to or higher than the carbonitriding temperature (850° C.).

Conventional carbonitrided sample: comparative example

Carbonitriding was performed at 850° C. held for 150 minutes in an atmosphere of a mixture of RX gas and ammonia gas. Quenching was successively done from the carbonitriding temperature and no secondary quenching was done.

Normal quenched sample: comparative example

Without carbonitriding, quenching was done by increasing the temperature to 850° C. and no secondary quenching was done.

For the samples above, tests were conducted for (1) measuring the amount of hydrogen, (2) measuring crystal grain size, (3) Charpy impact test, (4) measuring fracture stress, and (5) rolling fatigue test. The results are shown in Table 1 as well.

The measuring methods and the test procedures are now described.

(1) Measurement of Hydrogen Amount

The amount of hydrogen was determined by means of a DH-103 hydrogen determinator manufactured by LECO Corporation to analyze the amount of non-diffusible hydrogen in a steel. The amount of diffusible hydrogen was not measured. Specifications of the LECO DH-103 hydrogen determinator are as follows:

Analysis range: 0.01–50.00 ppm
Analysis precision: ±0.1 ppm or ±3% H (higher one)
Analysis sensitivity: 0.01 ppm
Detection method: thermal conductimetry
Sample weight size: 10 mg–35 g (max: 12 mm (diameter)×100 mm (length))
Furnace temperature range: 50° C.–1100° C.
Reagent: anhydron $Mg(ClO_4)_2$, Ascarite and NaOH
Carrier gas: nitrogen gas, Dosing gas: hydrogen gas (Both gases have a purity of at least 99.99% and a pressure of 40 PSI (2.8 kgf/cm²).)

The procedure of the analysis is roughly described here. A sample was taken by a dedicated sampler and the sample together with the sampler was put into the hydrogen determiner. Diffusible hydrogen therein was directed by the nitrogen carrier gas to a thermal conductimetry detector. The diffusible hydrogen was not measured in this example. Then, the sample was taken out of the sampler to be heated in a resistance heater and non-diffusible hydrogen was directed by the nitrogen carrier gas to the thermal conductimetry detector. The thermal conductivity was measured by the thermal conductimetry detector to determine the amount of non-diffusible hydrogen.

(2) Measurement of Crystal Grain Size

The crystal grain size was measured according to the method of testing the crystal grain size of austenite in a steel, defined by JIS G 0551.

(3) Charpy Impact Test

A Charpy impact test was conducted according to the Charpy impact test method for a metal material defined by JIS Z 2242. A test piece used here was a U-notch test piece (JIS No. 3 test piece) defined by JIS Z 2202. Note that a Charpy impact value is a value of absorption energy E, as described below, that is divided by cross section (0.8 cm²).

Absorption energy $E = WgR(\cos\beta - \cos\alpha)$
Hammer weight W=25.438 kg
Gravitational acceleration g=9.80665 m/sec²
Distance R from center of axis of rotation of hammer to center of gravity=0.6569 m
Hammer lifted by angle α=146°
Hammer moved upward and downward by angle β

(4) Measurement of Fracture Stress

Figure 9:
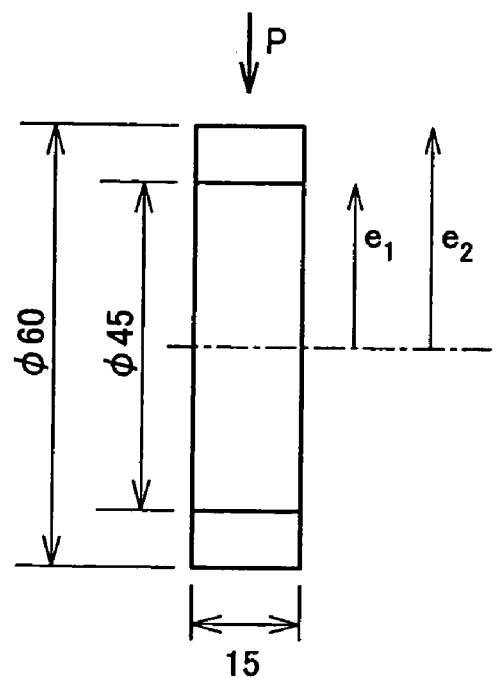
FIG. 9 shows a test piece for testing static-pressure fracture strength (measuring fracture stress).

FIG. 9 shows a test piece used for measuring fracture stress. An Amsler universal tester was used to exert a load in a direction P in FIG. 9, and the load when the test piece was fractured was measured. Then, the fracture load obtained was converted into a stress value by the following stress calculation formula for a curved beam. It is noted that the test piece to be used is not limited to the one shown in FIG. 9 and may be any test piece having a different shape.

When a fiber stress on the convex surface of the test piece shown in FIG. 9 is represented as $\sigma_1$ and a fiber stress on the concave surface is represented as $\sigma_2$, $\sigma_1$ and $\sigma_2$ are determined by the following formulae (JSME Mechanical Engineer's Handbook, A4—strength of materials, A4–40). Here, N indicates an axial force of a cross section including the axis of the annular test piece, A indicates a cross-sectional area, $e_1$ indicates an outer radius, $e_2$ indicates an inner radius, and $\kappa$ is a section modulus of the curved beam.

$$\sigma_1 = (N/A) + \{M/(A\rho_o)\}[1 + e_1/\{\kappa(\rho_o + e_1)\}]$$

$$\sigma_2 = (N/A) + \{M/(A\rho_o)\}[1 - e_2/\{\kappa(\rho_o - e_2)\}]$$

$$\kappa = -(1/A) \int_A \{\eta/(\rho_o + \eta)\} dA$$

(5) Rolling Fatigue Test

Figure 10A:
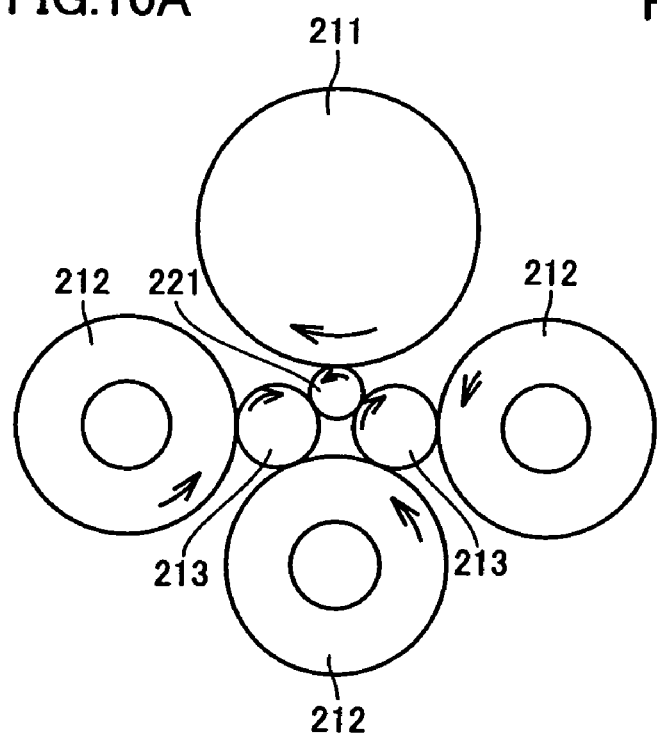
FIG. 10A is a schematic front view of a rolling fatigue life tester.
Figure 10B:
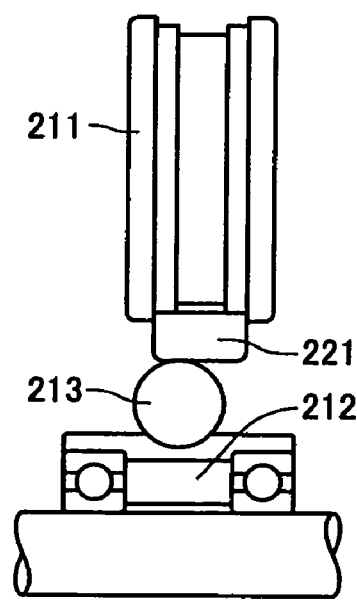
FIG. 10B is a schematic side view thereof.

Test conditions for a rolling fatigue life test are shown in Table 2. FIGS. 10A and 10B schematically show a rolling fatigue life tester. Referring to FIGS. 10A and 10B, a test piece 221 undergoing the rolling fatigue life test was driven by a driving roll 211 to rotate while being in contact with balls 213. Balls 213 were (¾)" balls guided by a guiding roll 212 to roll. Balls 213 exerted a high surface pressure on test piece 221 while test piece 221 also exerted a high surface pressure on balls 213.

Hereinafter, the results of the above-described measurements and tests are described.

(1) Amount of Hydrogen

As shown in Table 1, the conventional carbonitrided sample without being additionally processed has a considerably large hydrogen amount of 0.72 ppm in the steel. A reason therefor is considered that ammonia ($NH_3$) contained in the atmosphere in the carbonitriding process is decomposed and then hydrogen enters the steel. By comparison, the hydrogen amount in the steel of respective samples B-F is reduced to 0.37–0.42 ppm, or no more than 0.5 ppm, which is almost a half of that of the conventional carbonitrided sample. This amount of hydrogen in the steel is substantially equal to that of the normal quenched sample.

The above-described reduction of the hydrogen amount in the steel can lessen the degree of embrittlement of the steel that is due to hydrogen in the solid solution. In other words, by the reduction of the hydrogen amount, the Charpy impact values and the fracture stress values of samples B-F of the present invention are remarkably improved.

(2) Crystal Grain Size

Regarding the crystal grain size, samples that are secondary quenched at a temperature lower than the quenching temperature in the carbonitriding process (primary quenching), namely samples B-D, have austenite grains which are remarkably made fine, with the crystal grain size number of 11–12, as shown in Table 1. Samples E and F as well as the conventional carbonitrided sample and the normal quenched sample have austenite grains with the crystal grain size number of 10, which are coarser than the crystal grains of samples B-D.

(3) Charpy Impact Value

Table 1 shows that the Charpy impact value of the conventional carbonitrided sample is 5.33 J/cm², while those of samples B-F of the present invention are higher, ranging from 6.20 J/cm² to 6.65 J/cm². It is also seen from those that a lower secondary quenching temperature leads to a higher Charpy impact value. The normal quenched sample has a high Charpy impact value of 6.70 J/cm².

(4) Fracture Stress Value

The fracture stress value corresponds to anti-crack strength. It is seen from Table 1 that the fracture stress value of the conventional carbonitrided sample is 2330 NPa. By comparison, the fracture stress values of samples B-F are improved to 2650–2840 MPa, i.e., equal to 2650 MPa or higher. The normal quenched sample has a fracture stress value of 2770 MPa, which is in the range of the fracture stress values of samples B-F. It is considered that the reduction in hydrogen content greatly contributes to the improved anti-crack strength of samples B-F as well as the reduction in size of austenite crystal grains.

(5) Rolling Fatigue Test

According to Table 1, the normal quenched sample has the shortest rolling fatigue life ($L_{10}$) due to the absence of nitriding layer in the surface layer. By comparison, the rolling fatigue life of the conventional carbonitrided sample is 3.1 times longer. Samples B-D are remarkably improved in rolling fatigue life, as compared with the conventional carbonitrided sample. Samples E and F each have the rolling fatigue life almost equal to that of the conventional carbonitrided sample.

In summary, samples B-F of the present invention have lower hydrogen contents in the steel, improved fracture stress values and improved Charpy impact values. However, additional improvement in rolling fatigue life is seen only in samples B-D having finer austenite crystal grains with the crystal grain size number of at least 11. Accordingly, although samples B-F fall within the scope of the present invention, samples B-D subjected to secondary quenching at a temperature lower than the carbonitriding temperature to obtain finer crystal grains fall within the more desirable scope of the present invention.

EXAMPLE 2

Example 2 of the present invention is now described.

On the following samples X, Y and Z, a series of tests was conducted. A material to be heat-treated, employed commonly to samples X-Z, was JIS-SUJ2 (1.0 wt % of C-0.25 wt % of Si-0.4 wt % of Mn-1.5 wt % of Cr). Samples X-Z were each processed through the following procedure.

Sample X—comparative example: normal quenching only (without carbonitriding)

Sample Y—comparative example: quenching directly after carbonitriding (conventional carbonitriding and quenching)

Carbonitriding was conducted at 845° C. held for 150 minutes. The atmosphere in the carbonitriding process was a mixture of RX gas and ammonia gas.

Sample Z—example of the present invention: A bearing steel material was subjected to the thermal treatment pattern shown in FIG. 2. Carbonitriding was conducted at 845° C. held for 150 minutes. The atmosphere in the carbonitriding process was a mixture of RX gas and ammonia gas. A final quenching temperature was 800° C.

(1) Rolling Fatigue Life

Test conditions for the rolling fatigue life test are shown in Table 2. The tester shown in FIGS. 10A and 10B was used. Results of the rolling fatigue life test are shown in Table 3.

TABLE 2

| | |
|---|---|
| test piece | Φ12 × L22 cylindrical test piece |
| number of tested pieces | 10 |
| counterpart steel ball | ¾" (19.05 mm) |
| contact surface pressure | 5.88 GPa |
| load speed | 46240 cpm |
| lubricating oil | turbine VG68 - forced circulation lubrication |

TABLE 3

| sample | life (load count) | | relative $L_{10}$ |
| --- | --- | --- | --- |
| | $L_{10}$ (×10⁴ times) | $L_{10}$ (×10⁴ times) | |
| X | 8017 | 18648 | 1.0 |
| Y | 24656 | 33974 | 3.1 |
| Z | 43244 | 69031 | 5.4 |

According to Table 3, sample Y (comparative example) having undergone the carbonitriding process has a rolling fatigue life ($L_{10}$ life: one out of ten test pieces being damaged) that is 3.1 times as long as that of sample X (comparative example) having undergone normal quenching only, and thus, it is seen that the effect of extending the life is obtained through the carbonitriding process. By comparison, sample Z of the present invention has a longer life, which is 1.74 times as long as that of sample Y and 5.4 times as long as that of sample X. It is considered that this improvement is obtained mainly from the fine microstructure.

(2) Charpy Impact Test

A Charpy impact test was conducted by using a U-notch test piece defined by JIS Z 2242 described above. Test results are shown in Table 4.

TABLE 4

| sample | Charpy impact value (J/cm²) | relative impact value |
| --- | --- | --- |
| X | 6.7 | 1.0 |
| Y | 5.3 | 0.8 |
| Z | 6.7 | 1.0 |

The Charpy impact value of sample Z of the present invention is equal to that of sample X (comparative example) having undergone normal quenching only, and higher than that of sample Y (comparative example) having undergone carbonitriding.

(3) Static Fracture Toughness Test

Figure 11:
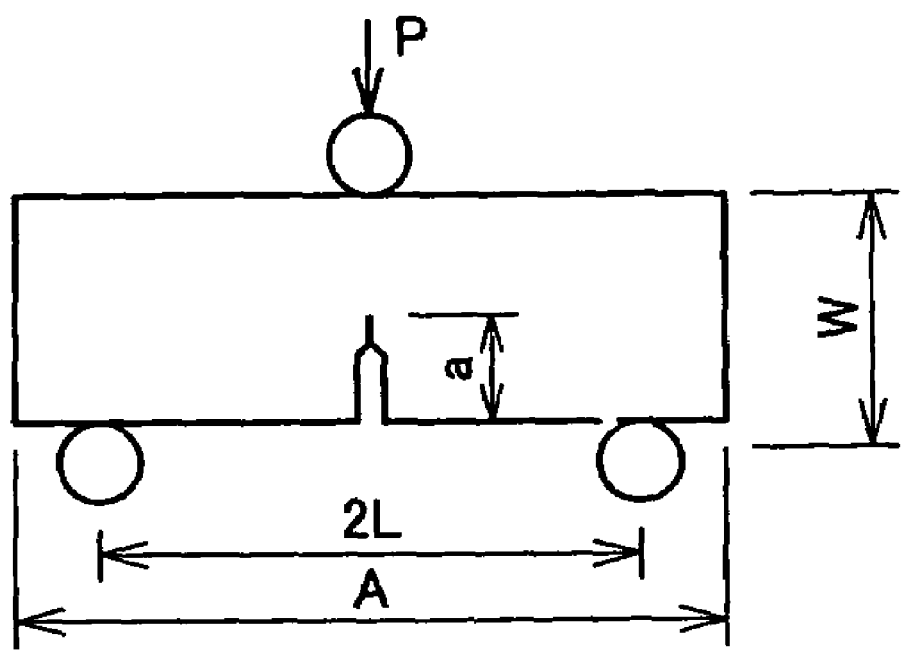
FIG. 11 shows a test piece for testing static fracture toughness.

FIG. 11 shows a test piece used for a static fracture toughness test. A pre-crack of approximately 1 mm was made in the test piece, and a static load P was added thereto by three-point bending. A fracture load was then determined. The following formula was used to calculate a fracture toughness value ($K_{IC}$ value). Results of the test are shown in Table 5.

$$K_{IC}=(PL\sqrt{a}/BW^2)\{5.8-9.2(a/W)+43.6(a/W)^2-75.3(a/W)^3+77.5(a/W)^4\}$$

TABLE 5

| sample | number tested | $K_1C$ (MPa√m) | relative $K_1C$ |
| --- | --- | --- | --- |
| X | 3 | 16.3 | 1.0 |
| Y | 3 | 16.1 | 1.0 |
| Z | 3 | 18.9 | 1.2 |

Since the pre-crack has a depth greater than the depth of the nitriding layer, the same results are obtained for samples X and Y of the comparative examples. By comparison, the fracture toughness value ($K_{IC}$ value) of sample Z of the present invention is approximately 1.2 times as high as those of samples X and Y of the comparative examples.

(4) Static-Pressure Fracture-strength Test (Measurement of Fracture Stress Value)

A static-pressure fracture-strength test piece as shown in FIG. 9 described above was used. A load was exerted in a direction P in FIG. 9 to conduct a static-pressure fracture-strength test in the same manner as described above. The test results are shown in Table 6.

TABLE 6

| sample | number tested | static fracture strength (kgf) | relative static fracture strength |
| --- | --- | --- | --- |
| X | 3 | 4200 | 1.00 |
| Y | 3 | 3500 | 0.84 |
| Z | 3 | 4300 | 1.03 |

Sample Y (comparative example) having been carbonitrided has a static-pressure fracture strength somewhat smaller than that of sample X (comparative example) having undergone normal quenching only. By comparison, sample Z of the present invention has a static-pressure fracture strength that is greater than that of sample Y and slightly higher than that of sample X.

(5) Rate of Secular Dimensional Change

The rate of secular dimensional change in the case of being held at 130° C. for 500 hours was measured. Table 7 shows the measurement results, together with the surface hardness and the amount of retained austenite (at a depth of 0.1 mm from the surface).

TABLE 7

| sample | number tested | surface hardness (HRC) | retained γ (volume %) | rate of dimensional change (×10⁻⁵) | relative rate of dimensional change*⁾ |
| --- | --- | --- | --- | --- | --- |
| X | 3 | 62.5 | 9.0 | 18 | 1.0 |
| Y | 3 | 63.6 | 28.0 | 35 | 1.9 |
| Z | 3 | 60.0 | 11.3 | 22 | 1.2 |

*smaller is superior

It is seen from the table that, as compared with the rate of dimensional change of sample Y having a large amount (volume %) of retained austenite, sample Z of the present invention has the smaller rate of dimensional change.

(6) Life Test Under Contaminated Lubricant Condition

Ball bearing 6206 was used to evaluate the rolling fatigue life under a contaminated lubricant condition having a predetermined amount of normal contaminants mixed therein. Test conditions are shown in Table 8 and test results are shown in Table 9.

TABLE 8

| load | Fr = 6.86 kN |
| --- | --- |
| contact surface pressure | Pmax = 3.2 Gpa |
| rotational speed | 2000 rpm |
| lubricant | turbine 56 - oil bath lubrication |
| amount of contaminant | 0.4 g/1000 cc |
| contaminant | grain size: 100–180 μm, hardness: Hv800 |

TABLE 9

| sample | $L_{10}$ life (h) | relative $L_{10}$ |
| --- | --- | --- |
| X | 20.0 | 1.0 |
| Y | 50.2 | 2.5 |
| Z | 74.0 | 3.7 |

Sample Y (comparative example) having undergone conventional carbonitriding has a lifetime that is approximately 2.5 times as long as that of sample X, and sample Z of the present invention has a lifetime that is approximately 3.7 times as long as that of sample X. While sample Z of the present invention has a smaller amount of retained austenite than that of sample Y of the comparative example, sample Z has a long lifetime because of the influences of entering nitrogen and fine microstructure.

It is accordingly seen from the above-discussed results that sample Z of the present invention, namely a bearing component constituting the support structure in the crank mechanism or a component of the crank mechanism produced by the thermal treatment method of the present invention, can simultaneously achieve the three goals of: extension of the fatigue life (rolling fatigue life in the case of the support structure), improvement of the anti-crack strength, and reduction of the rate of secular dimensional change, which were difficult to achieve by conventional carbonitriding.

It is noted that the austenite crystal grains herein refer to crystal grains of austenite having been phase-transformed during the heating process and remaining as traces even after transformed to martensite by cooling.

Further, in the above embodiments, the needle roller bearing may be either a full type roller bearing or a shell type needle roller bearing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A component of a crank mechanism, incorporated in the crank mechanism that converts reciprocating motion of a piston to rotary motion by means of a crank pin, a crank arm and a crank shaft via a connecting bar, wherein said component has a hydrogen content of no more than 0.5 ppm, wherein the component has a nitriding layer formed by a carbonitriding process.

2. A component of a crank mechanism, incorporated in the crank mechanism that converts reciprocating motion of a piston to rotary motion by means of a crank pin, a crank arm and a crank shaft via a connecting bar, wherein said component contains austenite grains having a grain size number exceeding 10, and wherein the component has a nitriding layer formed by a carbonitriding process.

3. A component of a crank mechanism, incorporated in the crank mechanism that converts reciprocating motion of a piston to rotary motion by means of a crank pin, a crank arm and a crank shaft via a connecting bar, wherein said component has a fracture stress value of no less than 2650 MPa, wherein the component has a nitriding layer formed by a carbonitriding process.

4. A support structure in a crank mechanism that converts reciprocating motion of a piston to rotary motion by means of a crank pin, a crank arm and a crank shaft via a connecting bar, the support structure having a plurality of bearings arranged therein, each said bearing including an inner member, an outer member and a plurality of rolling elements, wherein in at least one of said bearings, at least one of said inner and outer members and said rolling elements has a hydrogen content of no more than 0.5 ppm, wherein at least one of the inner and outer members and the rolling elements has a nitriding layer formed by a carbonitriding process.

5. The support structure in a crank mechanism according to claim 4, wherein at least one of said bearings arranged in said support structure is a bearing that is located at an end portion of said crank shaft to rotatably support said crank shaft.

6. A support structure in a crank mechanism that converts reciprocating motion of a piston to rotary motion by means of a crank pin, a crank arm and a crank shaft via a connecting bar, the support structure having a plurality of bearings arranged therein, each said bearing including an inner member, an outer member and a plurality of rolling elements, wherein in at least one of said bearings, at least one of said inner and outer members and said rolling elements contains austenite grains having a grain size number exceeding 10, wherein at least one of the inner and outer members and the rolling elements has a nitriding layer formed by a carbonitriding process.

7. The support structure in a crank mechanism according to claim 6, wherein at least one of said bearings arranged in said support structure is a bearing that is located at an end portion of said crank shaft to rotatably support said crank shaft.

8. A support structure in a crank mechanism that converts reciprocating motion of a piston to rotary motion by means of a crank pin, a crank arm and a crank shaft via a connecting bar, the support structure having a plurality of bearings arranged therein, each said bearing including an inner member, an outer member and a plurality of rolling elements, wherein in at least one of said bearings, at least one of said inner and outer members and said rolling elements has a fracture stress value of no less than 2650 MPa, wherein at least one of the inner and outer members and the rolling elements has nitriding layer formed by a carbonitriding process.

9. The support structure in a crank mechanism according to claim 8, wherein at least one of said bearings arranged in said support structure is a bearing that is located at an end portion of said crank shaft to rotatably support said crank shaft.

* * * * *